United States Patent [19]

Bendig et al.

[11] Patent Number: 4,615,935

[45] Date of Patent: Oct. 7, 1986

[54] GLASS FIBER REINFORCED CERAMIC PREFORM AND METHOD OF CASTING IT

[75] Inventors: Anna L. Bendig, Seattle; Bruce L. Zornes, Lynnwood, both of Wash.

[73] Assignee: The Boeing Company, Seattle, Wash.

[21] Appl. No.: 728,003

[22] Filed: Apr. 29, 1985

[51] Int. Cl.[4] .................... C03C 25/02; B32B 17/02
[52] U.S. Cl. .................................... 428/268; 428/427;
65/18.1; 65/18.2; 65/23; 65/36; 65/60.8;
156/89; 427/193; 427/376.2
[58] Field of Search .................. 65/18.1, 23, 18.2, 36,
65/60.53, 60.8; 156/89; 427/193, 376.2;
428/268, 269, 427

[56] References Cited

U.S. PATENT DOCUMENTS

| | | | |
|---|---|---|---|
| 2,404,904 | 7/1946 | Collins | 428/268 X |
| 2,466,849 | 4/1949 | Hood | 65/18.1 X |
| 3,179,531 | 4/1965 | Koubek | 427/193 |
| 3,292,544 | 12/1966 | Caldwell et al. | 102/92.5 |
| 3,336,873 | 8/1967 | Wilford | 427/193 X |
| 3,427,189 | 2/1969 | Brechna | 117/126 |
| 3,832,224 | 8/1974 | Brown | 427/376.2 |
| 3,869,334 | 3/1975 | Hughes et al. | 428/428 |
| 3,955,034 | 5/1976 | Fletcher | 428/332 |
| 4,092,194 | 5/1978 | Green | 427/376.2 |
| 4,110,487 | 8/1978 | Rion | 428/428 |
| 4,284,664 | 8/1981 | Rauch, Sr. | 428/241 |
| 4,410,598 | 8/1981 | Kuzel et al. | 428/427 X |

*Primary Examiner*—Arthur Kellogg
*Attorney, Agent, or Firm*—John C. Hammar; John C. Hammar

[57] ABSTRACT

Freestanding glass reinforced ceramic protective coatings are made with a shrinkable silica preform technique. The coatings may be bonded to heat sensitive organic (plastic) or inorganic (ceramic or metal) substrates to provide thermal and impact protection.

21 Claims, 3 Drawing Figures

4,615,935

GLASS FIBER REINFORCED CERAMIC PREFORM AND METHOD OF CASTING IT

TECHNICAL FIELD

The present invention relates to glass fiber reinforced ceramics, and, particularly, to a product and process for forming a freestanding, net-shaped glass fiber reinforced ceramic coating or skin, which provides thermal and impact protection when bonded to other temperature sensitive materials.

BACKGROUND ART

While glass fiber reinforced ceramic coatings can be formed on substrates which can withstand the firing temperatures of the glass powders used in the coatings, these processes do not allow coating temperature sensitive organic or inorganic substrates which cannot be fired. Problems exist with forming these coatings on certain metals. With the advent of advanced composites and resins, there is a greater need to develop a process to allow protection of these sensitive inorganic and organic substrates with glass protective coatings. The present invention suggests one method for forming freestanding net-shaped, glass fiber reinforced ceramics useful as protective coatings for the types of substrates.

SUMMARY OF THE INVENTION

Freestanding ceramic protective coatings or skins are formed by laying a reinforcing glass cloth on a silica fiber preform, applying a slurry of glass powder to the cloth, drying the slurry, and firing the preform and cloth to melt the glass powder. During the firing, the silica fiber preform shrinks to free the preform from the ceramic coating. Release materials are unnecessary. When melted, the glass forms a smooth surface on the cloth, and cools to a high tolerance protective coating useful for bonding to heat sensitive inorganic and organic substrates (such as metals or plastics). The bonded coating provides thermal and impact protection for the underlying substrate, and extends the usefulness of these sensitive substrates to many aerospace applications.

BEST MODE CONTEMPLATED FOR CARRYING OUT THE INVENTION

Figure 1:
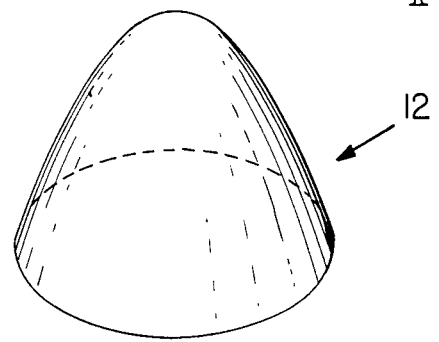
FIG. 1 is an isometric of a freestanding ceramic coating of the present invention.
Figure 2:
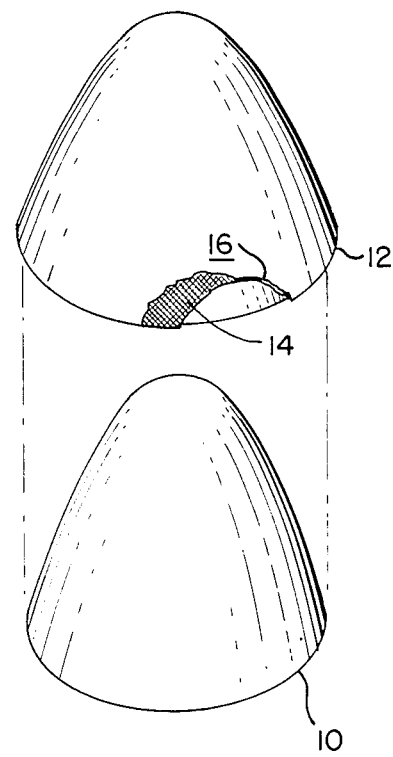
FIG. 2 is an exploded view, partially broken away, of the ceramic coating of FIG. 1 and its preform mold for manufacture.
Figure 3:
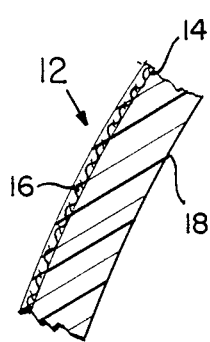
FIG. 3 is a partial sectional view of the ceramic coating of FIG. 1 bonded to a substrate.

A silica fiber preform 10 is formed to the corresponding shape of the temperature sensitive substrate to be protected with the protective ceramic coating 12 by felting a slurry of silica fibers into a mat within a suitable mold. A NEXTEL® glass fiber cloth 14 (of aluminoborosilicate fibers that are barrier coated with boron nitride (BN) according to the method of Simpson and Verzemnieks) is laid on the preform 10, and is loosely attached to the preform with suitable refractory thread (not shown) loosely stitched between the cloth and preform. Refractory metal U-shaped tacks or a fugitive thread may also be used. A slurry of finely ground (-325 ANSI mesh) Pyrex® borosilicate glass powder is brushed or sprayed onto the cloth, and is allowed to dry to a uniform layer 16 of about 0.03–0.10 inches. Drying may be completed in an oven at low temperatures or with a heat gun. Once dried, the preform, cloth, and slurry are fired in an oven for about 2–5 minutes (5 minutes is preferred) at about 2000° F. to melt the glass 16. The small grains of glass powder melt quickly, and the melt flows on the cloth 14 to form a smooth surface. Quick melting reduces heat degradation of the cloth, since the exposure time is reduced. The heat causes the silica fiber preform 10 to shrink away from the glass and cloth. Upon cooling by quenching the workpiece in ambient air, a freestanding ceramic protective coating 12 is obtained. This ceramic coating 12 may then be bonded to a corresponding surface of a heat sensitive substrate 18, with conventional resinous adhesives or with high temperature cements.

The barrier coating on the NEXTEL cloth is formed by exposing the NEXTEL fibers to a nitriding atmosphere in a furnace at about 2200°–2400° F. to form a uniform BN coating on each fiber, as explained by Simpson and Verzemnieks in their copending patent application. Other processes for barrier coating the cloth, such as chemical vapor deposition, may be used, if desired. Barrier coated fiber cloths bind less rigidly to glass matrices, so that crack propagation is dissipated. The glass is strengthened to thermal shocks and impacts. While BN barrier coated NEXTEL fiber cloth is highly preferred, especially with PYREX glass, other reinforcing fibers may be used.

As explained by Simpson and Verzemnieks, the BN barrier coating allows slip between the aluminoborosilicate fiber and the glass matrix which uncouples the matrix from the fiber reinforcement to stop crack propagation. Barrier coated silicon carbide may be a suitable substitute for barrier coated NEXTEL fibers, although we have yet to test it. Of course, while it is preferred that the coating be as resistive to crack propagation as possible, it is not a critical feature of this invention that the freestanding coating possess the optimal resistance to crack propagation. Accordingly, the coating can be formed from almost any combination of glass powders and reinforcing fibers which can withstand the firing-quenching regime. That is, in its broadest aspect, the invention relates to any freestanding glass coating formed according to this method.

The slurry preferably is a mixture of about 1 g of glass powder to 1.5 ml of isopropanol, although the concentration of the slurry is not critical. An aqueous slurry can be used but preferably only with reinforcing fibers other than barrier coated NEXTEL. Mixtures of sol-gel glass binders and glass powders may also be used, although the curing and firing cycles should be adjusted accordingly. Sufficient glass powder must be applied to the cloth to form the coating, which preferably has a final thickness of about 0.03–0.10 in. One or more applications of slurry can be used, although only a single firing is desirable. Isopropanol is a preferred carrier in the slurry because it wets the BN layer on the barrier coated NEXTEL cloth much better than water. Borosilicate (PYREX) glass powder is preferred, but other shock resistant, thermal glasses, sol-gel glasses, or combinations thereof might be used. The glass can be strengthed by exposing the molten glass to a nitriding atmosphere so that nitrogen replaces oxygen in the glass matrix and provides three-fold coordination of the metal matrix of the glass. Borosilicate glass is preferred because it has good thermal shock resistance, since it can be quenched instantly from 2000° F. to ambient without shattering. Such a quenching is quite severe, and most ceramics are unable to withstand this shock.

The freestanding coating 12 may be bonded or adhered to a heat sensitive inorganic (ceramic or meta) or organic (plastic) substrate 16 to provide thermal and impact protection to the substrate. The shape of the coating is determined by the shape and use of the underlying substrate. Simple curves are preferred so that the coating releases easily from the preform. Although a conical radome is illustrated, other shapes (like tiles, cylinders, and domes) may also be made.

Release materials are not required between the silica fiber preform 10 and fiber cloth 14. The heating alone causes the separation of the preform and cloth, leaving the unitary, freestanding ceramic coating 12 molded precisely to the desired shape. While other materials might possibly be used to form the preform, silica fibers have been used in our experiments. Uncharacteristically from most fiber mats, silica fiber preform shrinks radically and rapidly when exposed to high temperatures (above about 1850° F.) making silica fibers an ideal preform material.

The porosity of the protective coating can be adjusted so that the coating ranges from a solid glass sheet or film as shown to a network of glass tendrils encasing the individual fibers of the fiber cloth with openings between the fibers. Usually the coating is a solid film without any openings.

While preferred embodiment have been shown and described, those skilled in the art will recognize alterations, variations, and modifications which might be made to these embodiments without departing from the inventive concept. The claims should be construed liberally, therefore, to the full range of their equivalents and should not be limited to the particular embodiments which are shown and described, in view of this description and should only be limited as is necessary in light of the pertinent prior art.

We claim:

1. A method for forming a freestanding, net-shaped, glass fiber reinforced ceramic protective coating useful for providing thermal and/or impact protection to heat sensitive materials, which cannot withstand the normal firing of glass coating, comprising the steps of:
   (a) laying an aluminoborosilicate glass fiber cloth on a silica fiber preform of predetermined shape;
   (b) applying a slurry of glass powder to the cloth;
   (c) drying the slurry;
   (d) firing the perform, slurry, and cloth to melt the glass powder so that the glass forms a smooth surface on the cloth and to shrink the silica preform away from the cloth to release the cloth and glass from the preform without need of other release agents; and
   (e) cooling the glass and cloth to form the freestanding ceramic coating that is separable from the preform.

2. The method of claim 1 wherein the slurry includes finely ground borosilicate glass powder having a mesh size of less than about 325 ANSI mesh.

3. The method of claim 2 wherein the slurry includes isopropanol as a carrier.

4. The method of claim 2 wherein the slurry includes water as a carrier.

5. The method of claim 1 wherein the slurry includes a sol-gel glass precursor.

6. The method of claim 1 wherein the cloth is loosely attached to the preform during the laying up to hold the cloth during the remaining steps.

7. The method of claim 1 wherein the cloth is a boron nitride barrier coated aluminoborosilicate glass cloth.

8. The method of claim 1 wherein the firing step occurs at about 2000° F. for about 2-5 minutes.

9. The method of claim 2 wherein:
   (a) the cloth is a boron nitride barrier coated aluminoborosilicate fiber cloth;
   (b) the cloth is loosely attached to the preform during the laying up to position the cloth during later processing;
   (c) the firing step occurs at about 2000° F. for about 5 minutes; and
   (d) the cooling step includes quenching the preform and coating in ambient air.

10. The method of claim 9 wherein the slurry includes isopropanol as a carrier.

11. The freestanding, net-shaped glass fiber reinforced ceramic protective coating which is the product of the process of claim 1.

12. The freestanding, net-shaped glass fiber reinforced ceramic protective coating which is the product of the process of claim 9.

13. A composite, comprising:
   (a) a heat sensitive substrate which is unable to withstand the firing temperature necessary to form a protective glass coating directly on the substrate; and
   (b) a freestanding glass fiber reinforced protective glass coating made in a process not involving the substrate, bonded to one surface of the substrate;
   wherein the glass coating comprises borosilicate glass reinforced with a boron nitride barrier coated aluminoborosilicate fiber cloth.

14. A method for making a composite having a protective glass coating on at least one surface of a heat sensitive substrate which cannot withstand the direct firing of the glass to form the coating directly on the substrate, comprising the steps of:
   (a) forming a substrate into a predetermined shape, the substrate being heat sensitive so that the substrate cannot be fired at the melting temperature of glass powders;
   (b) forming a preform from silica fibers, the preform having a substantially identical shape with the substrate;
   (c) laying up ceramic glass fiber cloth on at least one surface of the perform;
   (d) applying a slurry of the glass powders to the cloth on the perform;
   (e) drying the slurry;
   (f) firing the perform, slurry, and cloth at a temperature higher than that temperature which the substrate can withstand to melt the glass powder so that the glass forms a smooth surface on the cloth and to shrink the perform away from the cloth to release the glass and cloth as a unitary coating free from the perform;
   (g) cooling the glass and cloth to produce a freestanding glass protective coating that is separable from the preform; and
   (h) bonding the freestanding glass protective coating to the corresponding surface of the substrate to form the composite.

15. The method of claim 14 wherein the glass fiber cloth is a boron nitride barrier coated aluminoborosilicate fiber and the glass powder is a borosilicate glass.

16. The method of claim 15 wherein the step of firing occurs at about 2000° F. for about 2–5 min.

17. The product of the process made according to the method of claim 14.

18. The product of the process made according to the method of claim 16.

19. A method for forming a freestanding, net-shaped, ceramic glass fiber reinforced ceramic protective coating useful for providing thermal and/or impact protection to heat sensitive materials, which cannot withstand the normal firing of glass coating, comprising the steps of:
 (a) laying up a ceramic glass fiber cloth on a silica fiber preform of predetermined shape;
 (b) applying a slurry of glass powder to the cloth;
 (c) firing the preform, cloth and slurry to at least about 2000° F. for at least about 2–5 min to melt the glass powder and to shrink the preform away from the cloth; and
 (d) cooling the glass and cloth to solidify the glass and to form a freestanding ceramic coating separable from the silica preform.

20. A method for forming a freestanding, net-shaped glass fiber reinforced ceramic protective coating useful for providing thermal and/or impact protection to heat sensitive materials, which cannot withstand the normal firing of glass coating, comprising the steps of:
 (a) laying a ceramic fiber cloth on a silica fiber preform of predetermined shape;
 (b) applying a slurry of glass powder to the cloth;
 (c) drying the slurry;
 (d) firing the perform, slurry, and cloth to at least about 2000° F. to melt the glass powder so that the glass forms a smooth surface on the cloth and to shrink the silica preform away from the cloth to release the cloth and glass from the preform without need of other release agents;
 (e) cooling the glass and cloth to solidify the glass and to form the ceramic coating; and
 (f) separating the ceramic coating from the silica preform.

21. A method for making a composite having a ceramic protective coating on at least one surface of a substrate, comprising the steps of:
 (a) forming a reinforced, ceramic coating by firing a slurry of glass powder coated onto a boron nitride barrier coated aluminoborosilicate fiber cloth; and
 (b) bonding the coating of step (a) to the surface of the substrate.

* * * * *